(12) United States Patent
Draese et al.

(10) Patent No.: US 8,442,988 B2
(45) Date of Patent: May 14, 2013

(54) ADAPTIVE CELL-SPECIFIC DICTIONARIES FOR FREQUENCY-PARTITIONED MULTI-DIMENSIONAL DATA

(75) Inventors: Oliver Draese, Holzgerlingen (DE); Namik Hrle, Boeblingen (DE); Oliver Koeth, Stuttgart (DE); Tianchao Li, Boeblingen (DE); Vijayshankar Raman, Sunnyvale, CA (US); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 12/939,605

(22) Filed: Nov. 4, 2010

(65) Prior Publication Data
US 2012/0117064 A1    May 10, 2012

(51) Int. Cl.
*G06F 17/30* (2006.01)

(52) U.S. Cl. ........ 707/750; 707/736; 707/758; 707/899; 382/239

(58) Field of Classification Search .......... None
See application file for complete search history.

(56) References Cited

U.S. PATENT DOCUMENTS

| | | | |
|---|---|---|---|
| 4,769,772 A * | 9/1988 | Dwyer ............... | 707/714 |
| 5,363,098 A | 11/1994 | Antoshenkov | |
| 5,511,190 A | 4/1996 | Sharma et al. | |
| 5,534,861 A | 7/1996 | Chang et al. | |
| 5,537,551 A | 7/1996 | Denenberg et al. | |
| 5,546,575 A | 8/1996 | Potter et al. | |
| 5,603,022 A | 2/1997 | Ng et al. | |
| 5,678,043 A | 10/1997 | Ng et al. | |
| 5,742,806 A | 4/1998 | Reiner et al. | |
| 5,794,228 A | 8/1998 | French et al. | |
| 5,794,229 A | 8/1998 | French et al. | |
| 5,819,282 A | 10/1998 | Hooper et al. | |
| 5,870,036 A | 2/1999 | Franaszek et al. | |
| 5,917,771 A | 6/1999 | Hill | |
| 5,918,225 A | 6/1999 | White et al. | |
| 6,006,234 A | 12/1999 | Govindarajan et al. | |
| 6,012,062 A * | 1/2000 | Jagadish et al. ........ | 1/1 |
| 6,018,738 A | 1/2000 | Breese et al. | |
| 6,049,630 A | 4/2000 | Wang et al. | |
| 6,092,070 A | 7/2000 | Belcea | |
| 6,161,105 A | 12/2000 | Keighan et al. | |
| 6,169,990 B1 | 1/2001 | McGregor et al. | |
| 6,289,339 B1 * | 9/2001 | Weber ................ | 707/770 |
| 6,309,424 B1 | 10/2001 | Fallon | |
| 6,330,555 B1 * | 12/2001 | Weber .................. | 1/1 |

(Continued)

OTHER PUBLICATIONS

Larsson, "The Context Trees of Block Sorting Compression," Proceedings of the IEEE Data Compression Conf., Snowbird, Utah, Mar. 30-Apr. 1, 1998, 10pgs.

(Continued)

*Primary Examiner* — Hung Le
(74) *Attorney, Agent, or Firm* — IP Authority, LLC; Ramraj Soundararajan

(57) ABSTRACT

A cell-specific dictionary is applied adaptively to adequate cells, where the cell-specific dictionary subsequently optimizes the handling of frequency-partitioned multi-dimensional data. This includes improved data partitioning with super cells or adjusting resulting cells by sub-dividing very large cells and merging multiple small cells, both of which avoid the highly skewed data distribution in cells and improve the query processing. In addition, more efficient encoding is taught within a cell in case the distinct values that actually appear in that cell are much smaller than the size of the column dictionary.

23 Claims, 5 Drawing Sheets

U.S. PATENT DOCUMENTS

| | | | |
|---|---|---|---|
| 6,345,267 | B1 | 2/2002 | Lohman et al. |
| 6,370,524 | B1 | 4/2002 | Witkowski |
| 6,381,601 | B1 | 4/2002 | Fujiwara et al. |
| 6,397,204 | B1 | 5/2002 | Liu et al. |
| 6,405,198 | B1* | 6/2002 | Bitar et al. ............... 1/1 |
| 6,493,728 | B1 | 12/2002 | Berger |
| 6,510,505 | B1 | 1/2003 | Burns et al. |
| 6,518,895 | B1 | 2/2003 | Weiss et al. |
| 6,529,912 | B2 | 3/2003 | Satoh et al. |
| 6,661,839 | B1 | 12/2003 | Ishida et al. |
| 6,768,818 | B2 | 7/2004 | Friederich et al. |
| 6,965,897 | B1 | 11/2005 | Chen |
| 7,039,764 | B1 | 5/2006 | Shetty et al. |
| 7,062,541 | B1 | 6/2006 | Cannon et al. |
| 7,088,271 | B2 | 8/2006 | Marpe et al. |
| 7,111,094 | B1 | 9/2006 | Liu et al. |
| 7,239,754 | B2 | 7/2007 | Akimoto et al. |
| 7,251,648 | B2 | 7/2007 | Chaudhuri et al. |
| 7,339,501 | B2 | 3/2008 | Ban et al. |
| 7,440,963 | B1 | 10/2008 | Bello et al. |
| 7,466,742 | B1 | 12/2008 | Srinivasan |
| 7,711,736 | B2 | 5/2010 | Levin |
| 7,739,275 | B2 | 6/2010 | Dubinko et al. |
| 7,827,187 | B2* | 11/2010 | Raman et al. ............... 707/750 |
| 7,860,865 | B2* | 12/2010 | Uppala ............... 707/737 |
| 2002/0143521 | A1 | 10/2002 | Call |
| 2003/0009596 | A1 | 1/2003 | Tonomura |
| 2003/0028509 | A1 | 2/2003 | Sah et al. |
| 2003/0052802 | A1 | 3/2003 | Wang et al. |
| 2003/0085821 | A1 | 5/2003 | Acharya et al. |
| 2003/0235307 | A1 | 12/2003 | Miyamoto |
| 2004/0010488 | A1 | 1/2004 | Chaudhuri |
| 2004/0062435 | A1 | 4/2004 | Yamaoka et al. |
| 2004/0139118 | A1 | 7/2004 | Yach |
| 2004/0148482 | A1 | 7/2004 | Grundy et al. |
| 2004/0193629 | A1 | 9/2004 | Mozes |
| 2005/0055367 | A1* | 3/2005 | Vo et al. ............... 707/102 |
| 2005/0060300 | A1 | 3/2005 | Stolte et al. |
| 2005/0071409 | A1 | 3/2005 | Gustavson et al. |
| 2005/0125476 | A1 | 6/2005 | Symes et al. |
| 2005/0187977 | A1 | 8/2005 | Frost |
| 2005/0192994 | A1 | 9/2005 | Caldwell et al. |
| 2005/0198473 | A1 | 9/2005 | Ford |
| 2006/0149938 | A1 | 7/2006 | Jiang et al. |
| 2006/0190497 | A1* | 8/2006 | Inturi et al. ............... 707/201 |
| 2006/0233257 | A1 | 10/2006 | Keith et al. |
| 2006/0251330 | A1 | 11/2006 | Toth et al. |
| 2007/0043531 | A1 | 2/2007 | Kosche et al. |
| 2007/0083531 | A1 | 4/2007 | Hussain |
| 2007/0143369 | A1* | 6/2007 | Uppala ............... 707/204 |
| 2007/0245119 | A1 | 10/2007 | Hoppe |
| 2007/0271268 | A1 | 11/2007 | Fontoura et al. |
| 2007/0273564 | A1 | 11/2007 | Morel |
| 2007/0294506 | A1 | 12/2007 | Ross |
| 2008/0021914 | A1 | 1/2008 | Davies et al. |
| 2008/0059492 | A1 | 3/2008 | Tarin |
| 2008/0059540 | A1 | 3/2008 | Brown et al. |
| 2008/0201336 | A1 | 8/2008 | Yamato |
| 2008/0263072 | A1 | 10/2008 | Koskas |
| 2008/0294676 | A1 | 11/2008 | Faerber et al. |
| 2008/0294863 | A1 | 11/2008 | Faerber et al. |
| 2009/0100089 | A1* | 4/2009 | Eadon et al. ............... 707/102 |
| 2009/0254521 | A1* | 10/2009 | Raman et al. ............... 707/3 |
| 2010/0030796 | A1 | 2/2010 | Netz et al. |

OTHER PUBLICATIONS

Huang et al., "Windowed Huffman Coding Algorithm with Size Adaptation," IEEE Proceedings-I, V140, N2, Apr. 1993, pp. 109-113.

"Effective INTER-Parallel Schemes for Compression/Decompression Speed-up," IBM TDB, V40, N4, Apr. 1997, pp. 157-165.

"Maximum Entropy Method of Data Encoding for Dictionaries and Texts," IBM TDB, V33, N6B, Nov. 1990, pp. 45-46.

Kistler et al., "Automated Data-Member Layout of Heap Objects to Improve Memory-Hierarchy Performance," ACM Transactions on Programming Languages and Systems, V22, N3, May 2000, pp. 490-505.

Rabbah et al., "Data Remapping for Design Space Optimization of Embedded Memory Systems," ACM Transactions on Embedded Computing Systems, V2, N2, May 2003, pp. 186-218.

Larson, "Data Reduction by Partial Preaggregation," Proceedings of the 18th Int'l Conf. on Data Engineering, Feb. 26-Mar. 1, 2002, San Jose, CA, pp. 706-715.

Raman et al., "Constant-Time Query Processing," IEEE 24th Int'l Conf. on Data Engineering, Apr. 7-12, 2008, 10pgs.

Ziv et al., "A Universal Algorithm for Sequential Data Compression," IEEE Transactions on Information Theory, V-IT23, N3, May 1977, pp. 337-343.

Guttman, "R-Trees: A Dynamic Index Structure for Spatial Searching," Proceedings of the 1984 ACM SIGMOD Int'l Conf. on Management of Data, V14, N2, Jun. 1984, pp. 47-57.

"Linear programming," <http://en.wikipedia.org/wiki/Linear programming>, 18pgs.

"Dynamic programming," <http://en.wikipedia.org/wiki/Dynamic programming>, 16pgs.

"Nonlinear programming," <http://en.wikipedia.org/wiki/Nonlinear programming>, 1pg.

"Kd-tree," <http://en.wikipedia.org/wiki/Kd-tree>, 8pgs.

* cited by examiner

ADAPTIVE CELL-SPECIFIC DICTIONARIES FOR FREQUENCY-PARTITIONED MULTI-DIMENSIONAL DATA

BACKGROUND OF THE INVENTION

1. Field of Invention

The present invention relates generally to the field of databases. More specifically, the present invention is related to adaptive cell specific dictionaries for frequency partitioned multi-dimensional data.

2. Discussion of Related Art

IBM Smart Analytic Optimizer uses a multi-dimensional partitioning scheme known as Frequency Partitioning (in short, FP) that partitions a table into cells. Each column of a table is logically divided into disjoint column partitions according to occurrence frequencies and the cross-product of column partitions defines the cells. Each column may be compressed using an encoding that is specified by a Dictionary. The dictionary for a column defines the column's partitioning and the encoding within a partition is fixed-length.

FIG. 1 shows an example table with three columns where the first column (A) and the third column (C) are split into 3 partitions while the middle column (B) is split only into 2 partitions. This results in 3×2×3 different cells. FIG. 2 illustrates the resulting cells from the partitioning example discussed above. The code lengths within such a cell are constant across all triples. The cell A2.B1.C2 for example has all tuple values encoded with 5+4+5=14 Bits.

With increasing amounts of columns and partitions, the amount of cells is increasing exponentially. Because a cell is created for each possible combination of column partitions, there are multiple cells which are only sparsely populated (or even empty) because the tuple value combination which is implicitly represented by the cell occurs only rarely within the real table data.

There exist costs associated with each cell with regard to several aspects:

Overhead for administrative meta data and data structure alignments ("pages"),

Processing overhead, as the encodings and tuple alignments are different for each cell.

Therefore the amount of cells is supposed to be limited and the amount of tuples per cell should exceed a pre-determined "cell threshold" to compensate for the cell costs. Cells with only few tuples are not desirable. Frequency partitioning can therefore only be applied up to a point where the overhead for creating more cells outweighs the benefit of shorted encoding; the amount of cells that is practical for the given application is called the "cell budget" for the partitioning.

Experiments with typical database tables have revealed the following facts:

Tables in large customer databases often have 50 to several 100 columns; with the described approach, splitting only 30 of these columns into only two partitions each would lead to more than 1 billion cells with the described approach; this is typically the same order of magnitude as there are rows found in the table. Therefore the necessity to treat all combinations of column partitions as separate cells puts a significant limit on the degree to which partitioning can be applied.

Partitioning a column is most beneficial when its value distribution is highly skewed, i.e. a small part of the occurring values has a very large probability. In a typical case, a single default for a column value (often NULL) occurs in 90% or more of all rows, while all other values have only a combined probability of 10%. If such 90/10 distributions are applied to a number of columns, the size of the resulting cells will differ very much even under the assumption of statistical independence of columns—correlation of columns in the actual data even amplifies the problem. Often a small number of cells receive most of the tuples while many cells are almost (or even completely) empty.

As a result, if the described FP approach is applied until a given cell budget is exhausted, this often leads to encodings where most of the rows of actual data go into only a few "large" cells. On the other hand, there are many "small" cells which receive so few rows that the overhead for managing an extra cell clearly outweighs the benefits of shorter encoding.

Another observation that can be made is the fact that we use the fixed length codes of the column partition to encode the values within a specific cell. With the same example of cell A2.B1.C2, we use 4 hits to encode all values of column B within that cell, but the actual count of distinct values for column B within cell A2.B1.C2 might be far less which implies that the values within the cell could be encoded with less than 4 bits. The count of distinct values within a cell can be far less than the count of distinct values within a column partition due to the following scenarios:

Correlated column: The column partitioning has been done for each column individually without taking correlation between columns into account. In an example where we have two columns like car make and car model and we have values like Honda/Accord and BMW/735i, we might end up with Honda and BMW in different column partitions of the make column, and Accord and 735i in different column partitions of the model column. We will still create cells for the combinations of all partitions but the real data will never contain the combinations Honda/735i or BMW/Accord, so the created cells will be very sparse and inefficiently encoded.

The combination of all column partitions leads to cells with few tuples only. This low amount of tuples will probably show a far smaller distinct count for each column than the original column partitions. Still using the fixed code width of the column partition therefore leads to a waste of bits per value.

Many of the above mentioned problems result from the use of a global column-wise dictionary, which forces the cells to be strictly cross-products of the partitions and wastes bits since it cannot take advantage of data locality. Our solution to the above problems is based on cell-specific dictionaries that are applied adaptively to adequate cells. The introduction of cell-specific dictionaries allows extensions of several different aspects of the frequency partitioning algorithm that lead to significant compression improvements for common cases of frequency-partitioned multi-dimensional data like those described above.

Multi-dimensional indexing methods, such as R-trees and Kd-Trees, partition a multi-dimensional value space into (possibly overlapping) hyper-rectangles. These trees often have non-grid like partitioning, which superficially resemble the partitioning formed by merging or splitting the cells after FP (as described later). Methods for keeping R-trees balanced often involve splitting large rectangles or merging small rectangles. However, multi-dimensional indexes partition the space of values, and not the actual data records themselves. In multi-dimensional indexes, each rectangle corresponds to (along each attribute) a contiguous range of values and values are not clustered into a cell based on frequency considerations. For example, if a column contains names of fruits, in a multi-dimensional index, if a rectangle holds apple and mango, the same must also hold the intermediate values banana and grape.

Using multiple dictionaries to compress a data set, including local dictionaries for blocks of data is a common practice in the data compression literature. The widely used Lempel-Ziv algorithms and their variants all use some form of block-level dictionary. There are also existing methods that use one of multiple dictionaries in an adaptive fashion for compression. The cell-specific dictionaries described in this patent application differ in that a cell is not a physical unit like a block—which is made up of a contiguous region of an input database, but instead a logical unit which is defined by specific values for the record attributes. Records in a FP cell need not necessarily be physically clustered together.

U.S. Pat. No. (6,161,105) to Keighan et al. teaches an improved database data structure and datatype for storing, manipulating and accessing multidimensional spatial data in a database. However, Keighan et al., and the well-known quad tree algorithms related to the patent, do not use frequency partitioning with dictionary-encoding and the cells that are derived by FP are also not used.

Embodiments of the present invention are an improvement over prior art systems and methods.

SUMMARY OF THE INVENTION

The present invention provides a cell-specific dictionary that is applied adaptively to adequate cells. Such a cell-specific dictionary is used to subsequently optimize the handling of frequency-partitioned multi-dimensional data. This includes improved data partitioning with super cells or adjusting resulting cells by sub-dividing very large cells and merging multiple small cells, both of which avoids the highly skewed data distribution in cells and improves the query processing. In addition, it also allows more efficient encoding within a cell in case the distinct values that appear in that cell are much smaller than the size of the column dictionary.

The present invention provides for a computer-based method comprising the steps of: (a) maintaining a global dictionary for each column in a plurality of columns associated with a database table; (b) partitioning each column in said plurality of columns into one or more partitions; (c) forming a plurality of cells, each cell formed by grouping a plurality of partitions; (d) maintaining at least one cell-specific dictionary for at least one cell among said plurality of cells; (e) receiving a query to compile and execute against said database table; (f) adaptively applying said at least one cell-specific dictionary for said at least one cell when said at least one cell crosses a boundary of column partitions or when compression can be improved; (g) compiling and executing said received query based on said application of at least one cell-specific dictionary for said at least one cell of said database table and said global dictionary for remainder of cells or columns; and (h) outputting said results of said compilation and execution step.

The present invention also provides for a computer-based method comprising the steps of: (a) maintaining a global dictionary for each column in a plurality of columns associated with a database table; (b) partitioning said each column in said plurality of columns into one or more partitions; (c) forming a plurality of cells, each cell formed by grouping a plurality of partitions; (d) maintaining at least one cell-specific dictionary for at least one cell among said plurality of cells; (e) processing any of the following post-processing cell adjustments: split processing or merge processing, said split processing comprising: splitting at least a single cell among said plurality of cells into two sub-cells and forming a cell-specific dictionary for each of said sub-cells; said merge processing comprising: merging at least two cells among said plurality of cells into a larger cell and forming a cell-specific dictionary as a superset of said at least two cells' dictionaries; (f) receiving a query to compile and execute against said database table; (g) adaptively applying said cell-specific dictionary/dictionaries for sub-cells, merged sub-cells, or split cells when at least one cell crosses a boundary of column partitions or compression can be improved; (h) compiling and executing said received query based on said adaptive application of said cell-specific dictionary/dictionaries for sub-cells, merged sub-cells, or split cells and said global dictionary for remainder of cell(s) or columns; and (i) outputting said results of said compilation and execution step.

The present invention also provides an article of manufacture comprising a computer storable medium storing computer readable program code which, when executed by a computer, implements the above methods.

DESCRIPTION OF THE PREFERRED EMBODIMENTS

Figure 1:
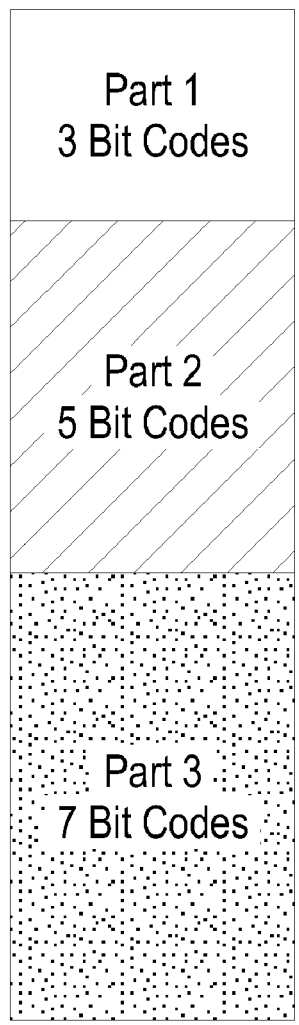
FIG. 1 illustrates an example of partitioning a table with three columns.
Figure 1:
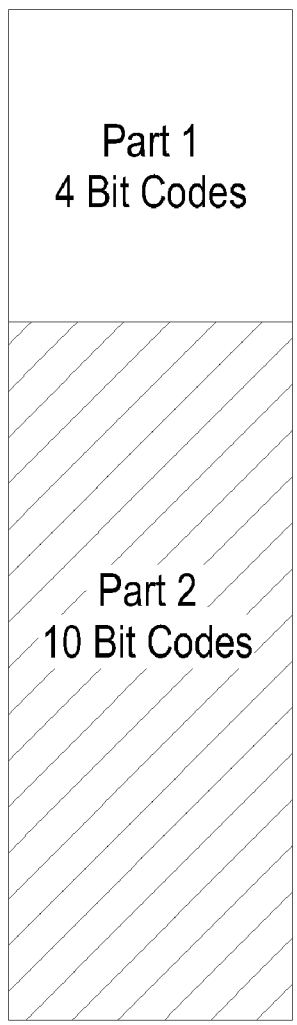
Figure 1:
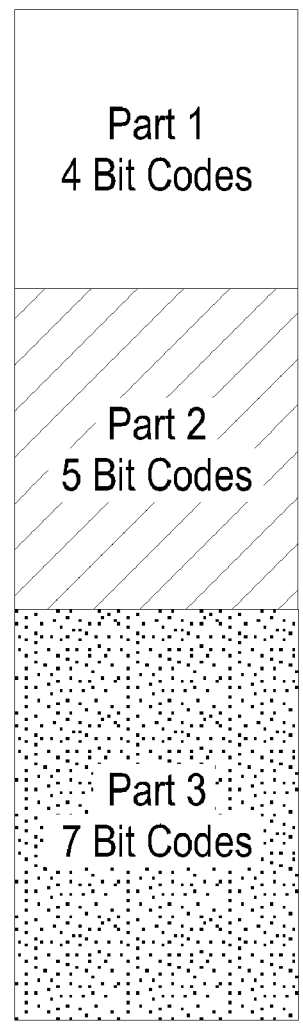
Figure 2:
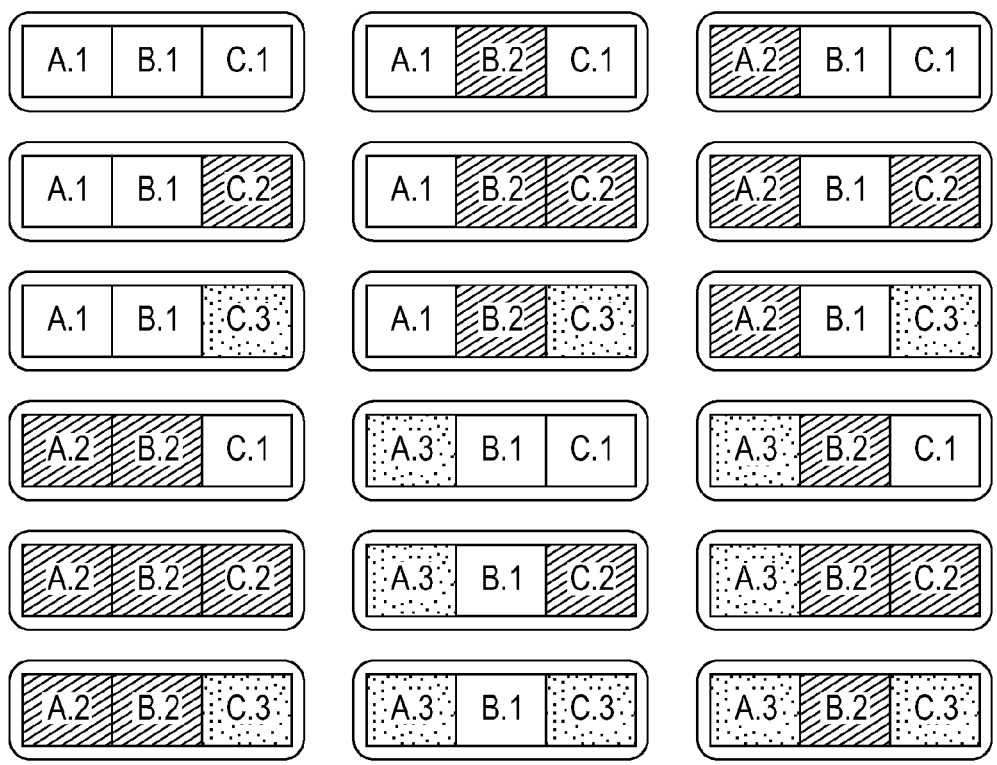
FIG. 2 illustrates the resulting cells from the partitioning example of FIG. 1.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides a cell-specific dictionary that is applied adaptively to adequate cells. Such a cell-specific dictionary is used to subsequently optimize the handling of frequency-partitioned multi-dimensional data. This includes improved data partitioning with super cells or adjusting resulting cells by sub-dividing very large cells and merging multiple small cells, both of which avoids the highly skewed data distribution in cells and improves the query processing. In addition, it also allows more efficient encoding within a cell in case the distinct values that appear in that cell are much smaller than the size of the column dictionary.

Adaptive Cell-Specific Dictionary

For each column, in addition to the global dictionary, an optional cell-specific dictionary can be applied adaptively—when the cell crosses the boundary of column partitions, or when compression can be improved.

Figure 3:
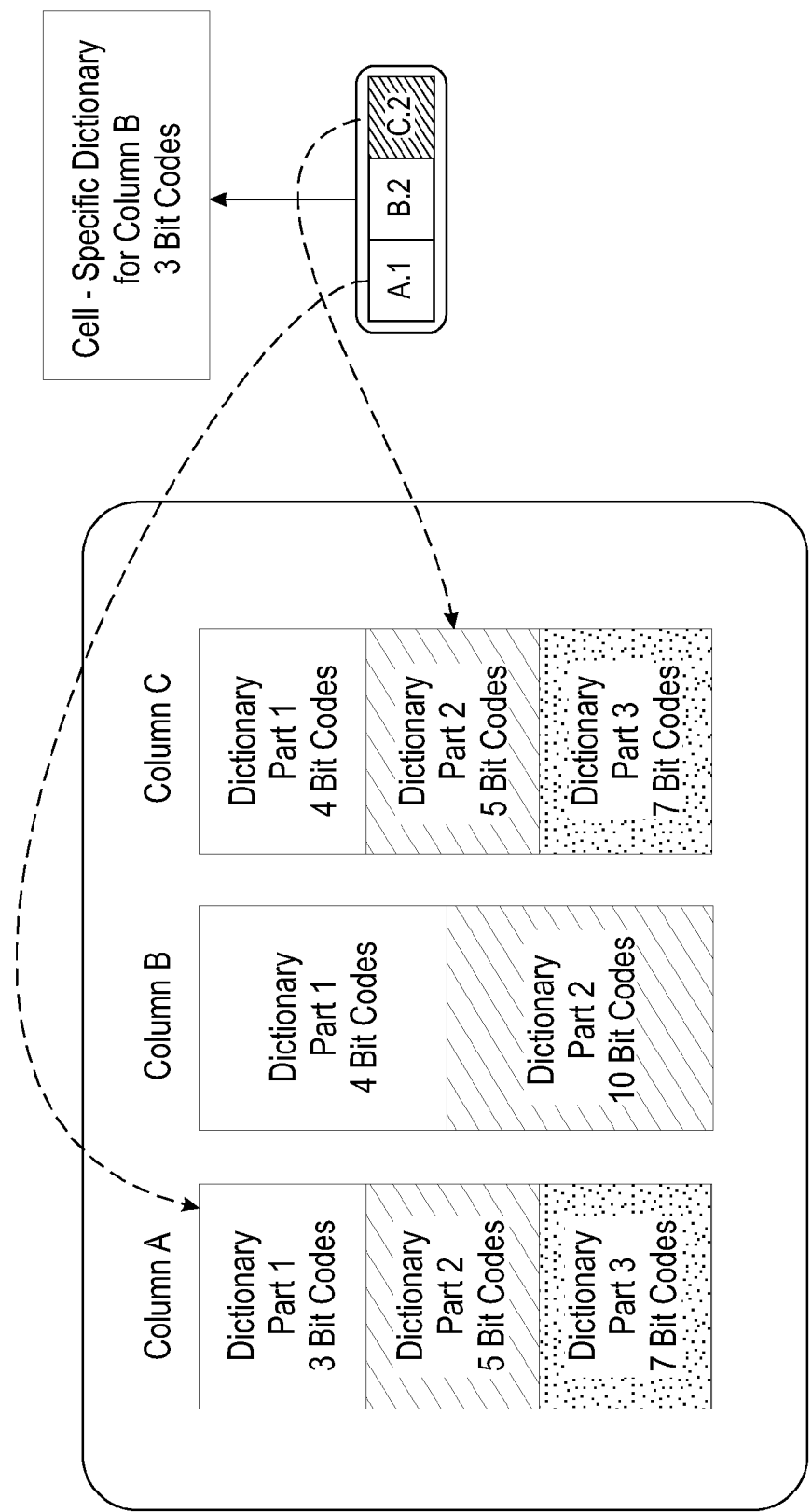
FIG. 3 illustrates a cell specific dictionary for a column.

In the example shown in FIG. 3, in addition to the global column-wise dictionary for columns A, B and C, cell A1.B2.C2 has a cell-specific dictionary for column B. While the original code length of partition 2 of column B is 10 bits, the cell-specific dictionary for that column (due to lower cardinality) has a much smaller code length of only 3 bits.

This is a saving of 7 bits per tuple within this cell. There is only one cell-specific dictionary in this example, but each cell might have a cell-specific dictionary and one or more columns (the same or different) in each cell can employ a specific dictionary.

It is still necessary to take into account the space needed by the additional dictionary itself. Therefore, it should be applied if the cell has enough tuples so that the savings of all columns and all tuples in the cell can compensate for the space needed by the additional dictionary, i.e. #tuples× #savings>size of additional dictionaries.

During query compile/execution, the cell-specific dictionary will be applied in cells where such dictionary is available for a column; otherwise it will turn back to the original global dictionary. In the example cell show in FIG. 3, column A and column C are still using the global dictionary of the corresponding column, and a cell—specific dictionary will be applied for column B.

Note that the additional dictionary does not need to store actual values for the encoding, because all the values that appear in the input data are already contained in the base dictionaries that represent the column partitions. The additional cell-specific dictionaries only describe a new encoding of these values, i.e. a mapping from bit codes to values. Therefore the mapping can be described by using references (for example, pointers or offsets to a well-defined base address) to the values in the base dictionary. For values that take a lot of space (e.g. strings), this typically means that additional cell-specific dictionaries add only a small overhead on top of the base dictionaries.

Thus, the cell-specific dictionary will consist of a table in which the encoded value maps to a pointer, and the pointer refers to the corresponding entry in the base dictionary. For example, each entry in the cell-specific dictionary will require only 10 bytes for a code width of 15 bits—8 bytes for the pointer and 2 bytes for the encoded value.

Like the column-wise global dictionaries in FP, cell-specific dictionaries can also allow to retain the property of order-preserving codes, meaning that code(v1)<code(v2) if and only if v1<v2. This makes it possible to evaluate inequality (range) predicates on the encoded values without decompressing them.

Smarter Partitioning with Super Cells

The target of frequency partitioning is to find the right balance between saved encoding space from adding more cells and the overhead introduced by additional cells. The combination of cell threshold and cell budget only guarantees the desired ratio of tuples to cells on average. This does not prevent data skew with many cells containing either too much or too few tuples. The cell-specific dictionary removes the harrier that restricts the cells boundary to cross column partitions. This allows deriving cells that are more evenly populated with the tuples. Various alternatives exist for the exact method to partition the data into cells.

Figure 4:
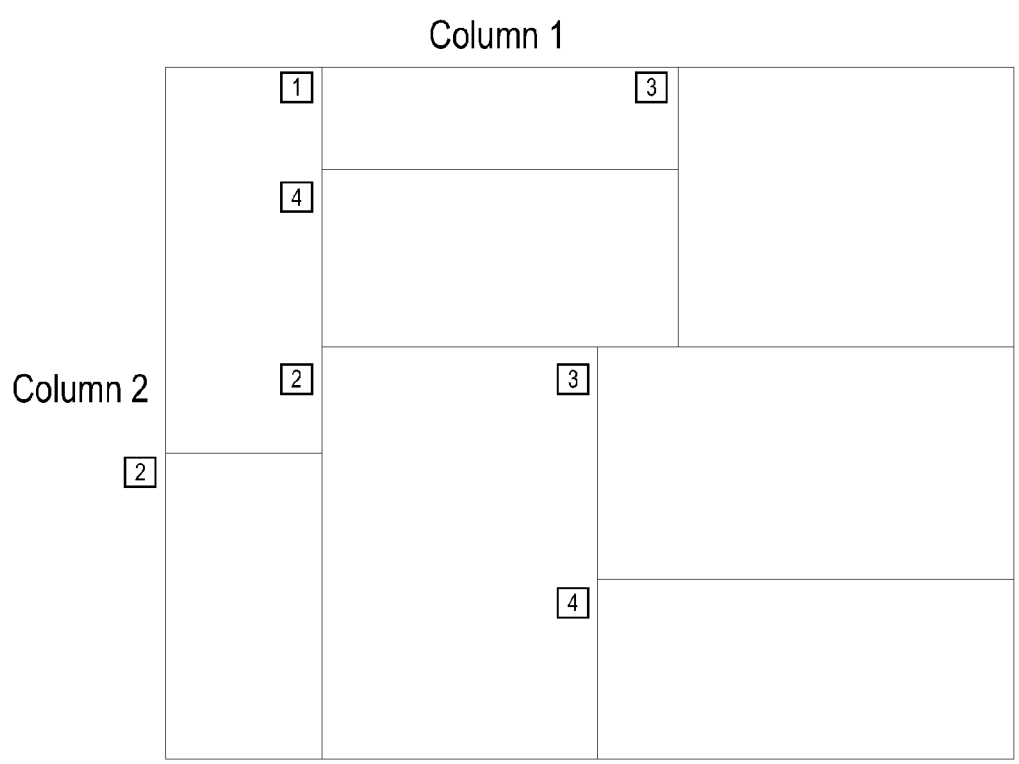
FIG. 4 illustrates defining cells with recursive partitioning.

One possible method is to separate the data into two parts by partitioning a column using the normal FP method, and recursively apply this to the resulting parts. This method, namely the Recursive Partitioning, is a variance of the famous Kd-Tree algorithm. FIG. 4 shows a simple example with 2-dimensional table. In this example, the tuples are divided into two parts by an optimal partition along column 1 (line marked 1), and the each part is divided again into two parts with line with mark 2, and so on. The applicability of recursive partition method totally relies on the cell-specific dictionary. Actually, due to the fact that the data are recursively partitioned, there is no global dictionary at all. This method can possibly derive the best partitioning in terms of compression. However, the drawback of this method is that it is complex and involves a lot of overhead, along with pervasive use of cell-specific dictionaries. Also, this method applies recursive construction of frequency histograms in each step, which is expected to constitute a major performance issue if the amount of data is huge.

Figure 5:
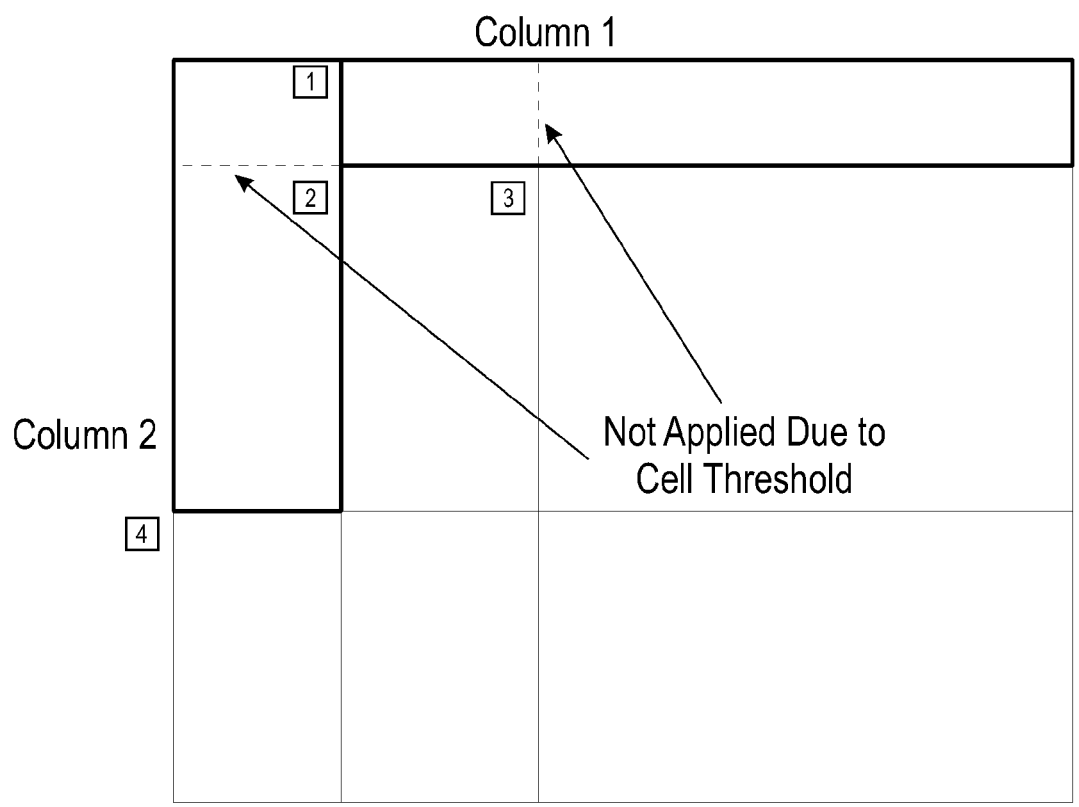
FIG. 5 illustrates defining cells with cross-product of column-partitions with super cells.

Another method that is not so intrusive can be derived from refinement of the original FP algorithm that partitions each column individually and forms cells as cross-product. One simple idea is to follow the same procedure, but avoid splitting cells that is will otherwise fall below cell threshold (called "super cells"). Using again the 2-dimensional table as example, FIG. 5 illustrates two super cells (bold boxes) that are not split by the column partitions. Cell-specific dictionaries are necessary for certain columns of super cells, and the global column dictionary can be applied otherwise.

The effectiveness of these partitioning approaches relies on an accurate prediction of cell sizes. Cell sizes can simply be predicted based on value probabilities for individual columns, assuming statistical independence of value distributions across columns. To account for column correlations in the input data, a more accurate prediction can be done by computing the actual cell distribution for a sample of the input rows.

Post-Processing Cell Adjustments

In case super-cell partitioning in the above session is not applied, or when super-cell partitioning alone is not sufficient to solve the problem of highly skewed data distribution in cells (due to inaccurate prediction of cell sizes, see above), post-processing adjustments can be applied on the resulting cells.

Two possible adjustments can be applied:
1. split large cells into smaller sub-cells.
2. merge very small cells into larger ones.

Both adjustment need to respect the cell budget (i.e. the maximal number of cells) and cell-threshold (i.e. the minimal number of tuples in a cell), but possibly only at a rough level. While splitting large cells will increase the amount of cells, merging small cells will decrease it. Therefore, it is possible to keep the number of cells close to the prescribed cell budget as a net effect of both. If only cell splitting is applied, the initial partitioning (either the original cross-product partitioning or the super-cell partitioning) need to be done under a slightly reduced cell budget to compensate for the expected increase of cells.

The post-processing adjustments are directly applied to compressed data in cells, which typically resides in main memory. Therefore, as compared to the compression of non-encoded tuples (which means larger volume in size) that reside on secondary storage or from network, this post-processing step can be applied much faster.

Splitting Large Cells

Splitting large cells helps to even better compress the skewed data in such cells. In addition, it also improves compression by more efficiently compressing values with higher frequency with shorter codes.

The basic procedure of splitting is essentially the same as partitioning uncompressed tuple values into cells (either the original FP based on cross-product of column partitions or the super-cell partitioning method mentioned above). Take the original cross-product partitioning for example, cell splitting starts with a data set consisting of rows and columns, collects the frequencies of values in each column into histograms and tries to partition some of the columns such that the most frequent values can be encoded with short codes, thereby grouping the data into sub-cells and reducing the overall code size.

In contrast to basic FP, the input data set is not an entire table, but only those rows in a cell. The values in the cell are already encoded and both histogram building and sorting of rows into sub-cells can process the data much faster. Also the cell budget is much smaller and therefore the partitioning terminates much sooner. The cell budget for basic FP is:

rows in table/cell-threshold, while that for the sub-dividing operation is only:

rows in large cell/cell-threshold.

We must restrict the splitting to a single cell, without affecting other cells that fall into the same partition of any of the affected columns. Otherwise, there is an exponential growth in the number of cells, depending on the number of column partitions. As an example, let us consider the example partitioning presented previously and assume that is the cell A1.B1.C1 is a "large" cell that should be further split into two distinct sub-cells. If we simply split partition B1 into two sub-partitions B1$a$ and B1$b$, there will be 8 additional cells affected (those that have B1 partition). When restricting the split to the single cell A1.B1.C1 it will result into only two sub-cells A1.B1$a$.C1 and A1.B1$b$.C1.

Therefore cell-specific dictionaries are important to take full advantage of such cell split adjustment. Cell-specific dictionary should be applied whenever the gain on compression can compensate the overhead for additional dictionary. More accurate criteria also has to take into consideration the additional overhead for the new sub-cells during query processing, especially the effort to specialize the query for the cell-specific dictionary. But at the same time, query performance on the data can also improve because the scan is directly applied on the compressed data, and possibly also better cache-locality. In the above example, instead of the global dictionary for B1, the resulting sub-cells might use cell-specific dictionaries B1$a$ and B1$b$, each covering one part of the global dictionary B1. If partition B1 has 16 distinct values (a global dictionary of 4 bits), and one of those values has a probability of 60% within those tuples that fall into cell A1.B1.C1, splitting this value out into a (zero-bit) partition B1$a$ with corresponding single-value dictionary allows to save 4 bits for 60% of the rows in cell A1.B1.C1. The remaining 15 values still need to be encoded with 4 bits, therefore there is no benefit to have a cell-specific dictionary for Bib and will continue to use the global dictionary for B1.

Merging Small Cells

As was described previously, the highly skewed data distribution in cells results in one side having several very big cells that possesses too many tuples (which is addressed by the splitting large cell adjustment described previously), and on the other side most cells being far below the cell threshold or even nearly empty. Merging small cells into a bigger one (until the cell-threshold) helps to solve this aspect of data skew problem.

Merging small cells into a bigger one reduces the amount of cells and in turn the overhead associated with the excessive amount of cells. Although merging small cells into a bigger one does not help to create shorter codes (actually as will be shown shortly, the code length is often longer in the cell-specific dictionary), it can improve the actual compression by avoiding the space overhead of almost-empty cells (this space overhead exists because practical storage management is usually done in units of "blocks" or "pages" that can fit 100s or 1000s of rows.). For example, if the page size is 4 KB, a cell with 100 rows encoded in 50 hits each and another with 100 rows encoded in 30 hits each will both use one page. If both can be combined into a cell with 60 bits per row, then the 200 rows still occupy only a single page, and we have actually saved one page.

Cell-specific dictionaries are crucial to take advantage of cell merge adjustment. Simply using the global dictionaries (dictionaries of the original cells) to encode tuples in the merged cell does not work because the merged cell crosses the boundary of column partitions. There are other ways to indicate that the values of a column the merged cell came from one of two different partitions in the original dictionary (like additional selection hits or concatenating both partitions into a "virtual partition" for a new encoding), but these lose the important property of an order-preserving encoding.

To illustrate this with a concrete example, two cells A1.B2.C1 and A3.B2.C2 are merged together into a bigger cell A1&3.B2.C1&2. The merged cell needs a cell-specific dictionary for column A as a super set of the global dictionary for A1 (partition 1 of column A) and A3, and for column C as a super set of the global dictionary for C1 and C2. The global dictionary of column B can be applied directly to the merged cell.

Since the cell-specific dictionary contains supersets of the dictionary entries for the merged cells, the fix-length dictionary code can be longer than the longest code of the original cells. This applies to the cell-specific dictionary for column A and column C in the above example. When more cells are merged, due to overlaps, such code length increment can he limited. For example, if A3.B2.C1 is to be merged with the two cells in the above example (A1.B2.C1 and A3.B2.C2), the cell-specific dictionary of the merged cell is the same as the original example when only A1.B2.C1 and A3.B2.C2 are merged together. Therefore, we should always only merge cells that are "close together" in the sense that they share the same partitions.

Recompressing Columns with Small Distinct Count

Both the super-cell partitioning and post-processing cell adjustments focus on improving tuple allocation into cells to address data skew and improve compression. Cell-specific dictionaries enable another independent aspect of optimization internally in a cell by exploiting correlations among columns.

As was mentioned earlier, due to column correlations, the actual set of distinct values in a cell can be far less than the values in the global dictionary, which lead to inefficient compression.

Consider the following drastic example:
Column C1 has 90% value A and 5000 other values (10%)
Column C2 correlated with C1, and has 90% value B and 5000 other values (10%)
Value A in column C1 is correlated to value B in column C2 (always appears together, a typical case is that A=B=NULL, i.e. if C1 is NULL then C2 is NULL as well).

Using frequency partitioning, column C1 is split into two partitions, with the first partition containing value A and can be encoded with 0 bit, and the second partition containing the remaining 10% values encoded with 13 bits. But splitting column C2 would exceed the cell budget, so that column ends up with a single partition encoded with 13 bits. The potential for the compression of 90% of the values in C2 is lost. This means that all cells that are on partition 1 of C1 will spend 13 bits to encode values in column C2, but actually there is only a single value B for column C2 in these cells, so it could be encoded with 0 bits instead. Although this specific example is based on the original FP, the same situation also happens in case of super-cell partitioning and after application of post-processing adjustments.

We can improve this situation using cell-specific dictionaries as another step of post-processing independent of the cell adjustment procedures. We start with compressed data in cells, and go through the cells to collect distinct values that actually appear separately for each of them. If the set of distinct values is much smaller than the values in the global dictionary, we create a cell-specific dictionary that only contains those values that actually appear. The actual criteria for "much fewer" are based on the number of bits that can he saved. Therefore, we can optimize the above process by stopping the collection of distinct values if we figure out that we do not have enough savings in a specific column.

If incremental updates to the table data are allowed, then this recompressing of columns with a small distinct count may lead to cases where new data does not fit previous correlation patterns and therefore does not match with a reduced cell-specific dictionary—i.e. it is not encodeable any more with the reduced dictionary. Such cases can still be treated efficiently because it is possible to decide between the global partition dictionary (which is always available) and a more efficient cell-specific dictionary at the level of sub-units of a cell (called pages or blocks), without having to introduce overhead for new dictionaries. So, the additional rows can be stored in a page that uses the global partition dictionary.

As a possible extension to the above mentioned idea, while cell-specific dictionaries allow having a specialized encoding for each column in each cell, it is also possible to share them between cells. The same 3 bit cell-specific dictionary for column B in cell A1.B2.C2 might be a shared dictionary with another cell, say A1.B2.C3. Determining which dictionary is shared by which cells in an optimal way can be done with various existing optimization algorithms or heuristics.

Similarly, choosing small cells to be merged together is an optimization problem on the set of "small cells" where "cost function" that should be minimized combines the following factors:
1. Difference between cell sizes and cell threshold (representing the processing overhead for small cells),
2. Extra space for required cell-specific dictionaries,
3. Increased encoding length because of larger merged dictionaries.

The cost function can be solved with a wide variety of existing and well-known algorithms. For example, computer science and Mathematics has a dedicated research topic for optimization-related algorithms, including, for example:
Linear programming or non-linear programming,
Using heuristics and statistics,
Dynamic programming, or
Applying the greedy algorithm of FP recursively.

The optimization starts out with 1 given by the current size of small cells and 2 and 3 at zero and can then minimize the overall cost by decreasing 1 and increasing 2 and 3.

The described method is based on frequency partitioning where each column of the multi-dimensional data is partitioned according to the frequency values. It is possible to extend the application of cell-specific dictionary to multi-dimensional data that is not frequency partitioned.

The described partitioning method can be performed more quickly by not building full histograms upfront that contain every individual value for each column. Alternatively, it is possible to compute the frequency histograms only based on a subset of the data, i.e. to perform sampling. If the subset of the data is well chosen, the basic properties of the data set are retained, i.e. the data skew. With sampling, it is possible to faster compute the cells upfront and also refine the cells (i.e. merge small cells and further sub-divide large cells) upfront.

That approach reduces the computation overhead at the expense of a reduced accuracy. When the full table data is finally loaded and stored in the cells derived from the sampled data, a subsequent optimization step can be applied, i.e. merge small cells or sub-divide large cells for which the sampled data was not representative. Sampling can also be applied to the post-processing procedures described above.

The present invention provides for a computer-based method comprising the steps of: (a) maintaining a global dictionary for each column in a plurality of columns associated with a database table; (b) partitioning each column in said plurality of columns into one or more partitions; (c) forming a plurality of cells, each cell formed by grouping a plurality of partitions; (d) maintaining at least one cell-specific dictionary for at least one cell among said plurality of cells; (e) receiving a query to compile and execute against said database table; (f) adaptively applying said at least one cell-specific dictionary for said at least one cell when said at least one cell crosses a boundary of column partitions or when compression can be improved; (g) compiling and executing said received query based on said application of at least one cell-specific dictionary for said at least one cell of said database table and said global dictionary for remainder of cells or columns; and (h) outputting said results of said compilation and execution step.

The present invention also provides for a computer-based method comprising the steps of: (a) maintaining a global dictionary for each column in a plurality of columns associated with a database table; (b) partitioning said each column in said plurality of columns into one or more partitions; (c) forming a plurality of cells, each cell formed by grouping a plurality of partitions; (d) maintaining at least one cell-specific dictionary for at least one cell among said plurality of cells; (e) processing any of the following post-processing cell adjustments: split processing or merge processing, said split processing comprising: splitting at least a single cell among said plurality of cells into two sub-cells and forming a cell-specific dictionary for each of said sub-cells; said merge processing comprising: merging at least two cells among said plurality of cells into a larger cell and forming a cell-specific dictionary as a superset of said at least two cells' dictionaries; (f) receiving a query to compile and execute against said database table; (g) adaptively applying said cell-specific dictionary/dictionaries for sub-cells, merged sub-cells, or split cells when at least one cell crosses a boundary of column partitions or compression can be improved; (h) compiling and executing said received query based on said adaptive application of said cell-specific dictionary/dictionaries for sub-cells, merged sub-cells, or split cells and said global dictionary for remainder of cell(s) or columns; and (i) outputting said results of said compilation and execution step.

Additionally, the present invention provides for an article of manufacture comprising computer readable program code contained within implementing one or more modules to implement adaptive cell specific dictionaries for frequency partitioned multi-dimensional data. Furthermore, the present invention includes a computer program code-based product, which is a storage medium having program code stored therein which can be used to instruct a computer to perform any of the methods associated with the present invention. The computer storage medium includes any of but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

The present invention also provides an article of manufacture comprising a computer storable medium storing computer readable program code which, when executed by a computer, implements the above methods.

CONCLUSION

A system and method has been shown in the above embodiments for the effective implementation of adaptive cell specific dictionaries for frequency partitioned multi-dimensional data. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A computer-based method comprising the steps of:
   (a) maintaining a global dictionary for each column in a plurality of columns associated with a database table;
   (b) partitioning each column in said plurality of columns into one or more partitions;
   (c) forming a plurality of cells, each cell formed by grouping a plurality of partitions;
   (d) maintaining at least one cell-specific dictionary for at least one cell among said plurality of cells;
   (e) receiving a query to compile and execute against said database table;
   (f) adaptively applying said at least one cell-specific dictionary for said at least one cell when said at least one cell crosses a boundary of column partitions or when compression can be improved;
   (g) compiling and executing said received query based on said application of at least one cell-specific dictionary for said at least one cell of said database table and said global dictionary for remainder of cells or columns;
   (h) outputting said results of said compilation and execution step, and
   wherein said partitioning comprising partitioning each column individually to form said plurality of cells as cross products, and super-cells are formed to avoid splitting cells that otherwise fall below a predetermined cell threshold.

2. The computer based method of claim 1, wherein said cell-specific dictionary describes a mapping from bit codes to values in a base dictionary.

3. The computer-based method of claim 2, wherein said mapping is based on references or pointers.

4. The computer-based method of claim 1, wherein large cells are further split, said splitting comprising: starting with a data set consisting of rows and columns, collecting frequencies of values in each column into histograms, and partitioning columns such that the most frequent values are encoded with short codes, thereby grouping the data into sub-cells and reducing the overall code size.

5. The computer-based method of claim 1, wherein smaller cells are merged into at least one bigger cell to improve compression.

6. The computer-based method of claim 1, wherein said computer-based method is implemented over a network.

7. The computer-based method of claim 6, wherein said network is a Local Area Network (LAN) or a Wide Area Network (WAN).

8. A computer-based method comprising the steps of:
   (a) maintaining a global dictionary for each column in a plurality of columns associated with a database table;
   (b) partitioning said each column in said plurality of columns into one or more partitions;
   (c) forming a plurality of cells, each cell formed by grouping a plurality of partitions;
   (d) maintaining at least one cell-specific dictionary for at least one cell among said plurality of cells;
   (e) processing any of the following post-processing cell adjustments: split processing or merge processing,
      said split processing comprising: splitting at least a single cell among said plurality of cells into two sub-cells and forming a cell-specific dictionary for each of said sub-cells;
      said merge processing comprising: merging at least two cells among said plurality of cells into a larger cell and forming a cell-specific dictionary as a superset of said at least two cells' dictionaries;
   (f) receiving a query to compile and execute against said database table;
   (g) adaptively applying said cell-specific dictionary/dictionaries for sub-cells, merged sub-cells, or split cells when at least one cell crosses a boundary of column partitions or compression can be improved;
   (h) compiling and executing said received query based on said adaptive application of said cell-specific dictionary/dictionaries for sub-cells, merged sub-cells, or split cells and said global dictionary for remainder of cell(s) or columns; and
   (i) outputting said results of said compilation and execution step.

9. The computer based method of claim 8, wherein said cell-specific dictionary describes a mapping from bit codes to values in a base dictionary.

10. The computer-based method of claim 9, wherein said mapping is based on references or pointers.

11. The computer-based method of claim 8, wherein said method further comprises the steps of:
   partitioning each column individually to form said plurality of cells as cross products; and
   forming super-cells by avoid splitting cells that otherwise fall below a predetermined cell threshold.

12. The computer-based method of claim 8, wherein large cells are split, said splitting comprising: starting with a data set consisting of rows and columns, collecting frequencies of values in each column into histograms, and partitioning columns such that the most frequent values are encoded with short codes, thereby grouping the data into sub-cells and reducing the overall code size.

13. The computer-based method of claim 8, wherein said computer-based method is implemented over a network.

14. The computer-based method of claim 13, wherein said network is a Local Area Network (LAN) or a Wide Area Network (WAN).

15. An article of manufacture comprising computer storage medium storing computer readable program code which, when executed by a computer, implements a computer-based method comprising the steps of:
   (a) maintaining a global dictionary for each column in a plurality of columns associated with a database table;
   (b) partitioning each column in said plurality of columns into one or more partitions;

(c) forming a plurality of cells, each cell formed by grouping a plurality of partitions;
(d) maintaining at least one cell-specific dictionary for at least one cell among said plurality of cells;
(e) receiving a query to compile and execute against said database table;
(f) adaptively applying said at least one cell-specific dictionary for said at least one cell when said at least one cell crosses a boundary of column partitions or when compression can be improved;
(g) compiling and executing said received query based on said application of at least one cell-specific dictionary for said at least one cell of said database table and said global dictionary for remainder of cells or columns;
(h) outputting said results of said compilation and execution step, and
wherein said partitioning comprising partitioning each column individually to form said plurality of cells as cross products, and super-cells are formed to avoid splitting cells that otherwise fall below a predetermined cell threshold.

16. The article of manufacture of claim 15, wherein said cell-specific dictionary describes a mapping from bit codes to values in a base dictionary, said mapping based on references or pointers.

17. The article of manufacture of claim 15, wherein large cells are further split, said splitting comprising: starting with a data set consisting of rows and columns, collecting frequencies of values in each column into histograms, and partitioning columns such that the most frequent values are encoded with short codes, thereby grouping the data into sub-cells and reducing the overall code size.

18. The article of manufacture of claim 15, wherein smaller cells are merged into at least one bigger cell to improve compression.

19. An article of manufacture comprising computer storage medium storing computer readable program code which, when executed by a computer, implements a computer-based method comprising the steps of:
(a) maintaining a global dictionary for each column in a plurality of columns associated with a database table;
(b) partitioning said each column in said plurality of columns into one or more partitions;
(c) forming a plurality of cells, each cell formed by grouping a plurality of partitions;
(d) maintaining at least one cell-specific dictionary for at least one cell among said plurality of cells;
(e) processing any of the following post-processing cell adjustments: split processing or merge processing,
said split processing comprising: splitting at least a single cell among said plurality of cells into two sub-cells and forming a cell-specific dictionary for each of said sub-cells;
said merge processing comprising: merging at least two cells among said plurality of cells into a larger cell and forming a cell-specific dictionary as a superset of said at least two cells' dictionaries;
(f) receiving a query to compile and execute against said database table;
(g) adaptively applying said cell-specific dictionary/dictionaries for sub-cells, merged sub-cells, or split cells when at least one cell crosses a boundary of column partitions or compression can be improved;
(h) compiling and executing said received query based on said adaptive application of said cell-specific dictionary/dictionaries for sub-cells, merged sub-cells, or split cells and said global dictionary for remainder of cell(s) or columns; and
(i) outputting said results of said compilation and execution step.

20. The article of manufacture of claim 19, wherein said cell-specific dictionary describes a mapping from bit codes to values in a base dictionary.

21. The article of manufacture of claim 20, wherein said mapping is based on references or pointers.

22. The article of manufacture of claim 19, wherein said method further comprises the steps of:
partitioning each column individually to form said plurality of cells as cross products;
and forming super-cells by avoid splitting cells that otherwise fall below a predetermined cell threshold.

23. The article of manufacture of claim 19, wherein large cells are split, said splitting comprising: starting with a data set consisting of rows and columns, collecting frequencies of values in each column into histograms, and partitioning columns such that the most frequent values are encoded with short codes, thereby grouping the data into sub-cells and reducing the overall code size.

* * * * *